United States Patent
Hornung et al.

(10) Patent No.: US 10,345,829 B2
(45) Date of Patent: Jul. 9, 2019

(54) INLET PRESSURE PERTURBATION INSENSITIVE MASS FLOW CONTROLLER

(71) Applicant: Sensirion AG, Stäfa (CH)

(72) Inventors: Mark Hornung, Stäfa (CH); Thomas Huber, Stäfa (CH); Philipp Reibisch, Stäfa (CH); Andreas Rüegg, Stäfa (CH)

(73) Assignee: SENSIRION AG, Stafa (CH)

(*) Notice: Subject to any disclaimer, the term of this patent is extended or adjusted under 35 U.S.C. 154(b) by 226 days.

(21) Appl. No.: 15/211,249

(22) Filed: Jul. 15, 2016

(65) Prior Publication Data

US 2017/0017246 A1     Jan. 19, 2017

(30) Foreign Application Priority Data

Jul. 17, 2015 (EP) .................... 15177191

(51) Int. Cl.
*G01F 1/86* (2006.01)
*G05D 16/20* (2006.01)
*G05D 7/06* (2006.01)

(52) U.S. Cl.
CPC ....... *G05D 16/2013* (2013.01); *G05D 7/0617* (2013.01); *G05D 7/0635* (2013.01); *G05B 2219/41303* (2013.01)

(58) Field of Classification Search
CPC .......... G01F 1/86; G01F 1/88; G01F 25/0007; G01F 1/34; G01F 1/36; G01F 1/68; Y10T 137/7759; Y10T 137/7761; Y10T 137/0324; Y10T 137/0379; Y10T 137/0396

See application file for complete search history.

(56) References Cited

U.S. PATENT DOCUMENTS

| 5,129,418 A | 7/1992 | Shimomura et al. |
| 7,216,019 B2 | 5/2007 | Tinsley et al. |
| 7,685,875 B2 * | 3/2010 | Zimmermann ....... G01F 1/6845 73/204.23 |

(Continued)

FOREIGN PATENT DOCUMENTS

| DE | 103 92 770 B3 | 8/2013 |
| EP | 1 065 475 A2 | 1/2001 |

(Continued)

*Primary Examiner* — Darrin D Dunn
(74) *Attorney, Agent, or Firm* — Foley & Lardner LLP (57) ABSTRACT

A mass flow controller (10) comprises a fluid inlet (15) and at least one first flow meter (11) to measure a first flow rate ($F_1$) and to output a first flow signal ($FS_1$); at least one second flow meter (12) to measure a second flow ($F_2$) rate and to output a second flow signal ($FS_2$); a control device (13) connected to said first and second flow meters (11,12) and configured and arranged to generate a control signal (C); and at least one control valve (14) connected to said control device (13) to control a total flow rate ($F_{out}$) through the mass flow controller (10) in response to the control signal (C). The control signal (C) is generated as a function of both the first and second flow signals ($FS_1$, $FS_2$) such that the mass flow controller's (10) sensitivity to perturbations of said inlet pressure is minimized.

15 Claims, 2 Drawing Sheets

(56) References Cited

U.S. PATENT DOCUMENTS

| | | | |
|---|---|---|---|
| 7,809,473 B2 | 10/2010 | Shajii et al. | |
| 7,905,140 B2 | 3/2011 | Kanne | |
| 8,056,579 B2* | 11/2011 | Takahashi | G05D 7/0635 137/486 |
| 2007/0131282 A1* | 6/2007 | Mohammed | F16K 7/17 137/487.5 |
| 2007/0174016 A1 | 7/2007 | Ding et al. | |
| 2008/0091306 A1 | 4/2008 | Shajii et al. | |
| 2008/0295892 A1* | 12/2008 | Takahashi | G05D 7/0635 137/87.03 |
| 2009/0312876 A1* | 12/2009 | Yoneda | G01F 1/6965 700/282 |
| 2011/0247696 A1 | 10/2011 | Zolock et al. | |
| 2012/0174992 A1* | 7/2012 | Shajii | G05D 7/0635 137/486 |
| 2013/0104996 A1* | 5/2013 | Oh | F16K 11/00 137/2 |
| 2014/0158211 A1* | 6/2014 | Ding | G01F 25/003 137/10 |
| 2014/0299204 A1 | 10/2014 | Somani | |
| 2014/0343875 A1* | 11/2014 | Spyropoulos | G01F 1/34 702/47 |
| 2016/0138394 A1* | 5/2016 | Brooks | E21B 43/11 73/152.07 |
| 2016/0341330 A1* | 11/2016 | Sneh | F16K 31/128 |

FOREIGN PATENT DOCUMENTS

| | | |
|---|---|---|
| EP | 1 396 705 A2 | 3/2004 |
| EP | 1 426 740 A2 | 6/2004 |
| EP | 1 443 314 A2 | 8/2004 |
| EP | 1 840 535 A1 | 10/2007 |
| EP | 1 840 536 A1 | 10/2007 |
| EP | 1 965 179 A1 | 9/2008 |
| EP | 2 107 347 A1 | 10/2009 |
| EP | 2 175 246 A1 | 4/2010 |
| EP | 2 365 411 A1 | 9/2011 |
| EP | 2 894 464 A1 | 7/2015 |
| EP | 3 29 429 A1 | 6/2016 |
| WO | WO 00/37895 A1 | 6/2000 |
| WO | WO 01/81872 A1 | 11/2001 |
| WO | WO 01/84087 A1 | 11/2001 |
| WO | WO 01/98736 A1 | 12/2001 |
| WO | WO 2012/021999 A1 | 2/2012 |

* cited by examiner

INLET PRESSURE PERTURBATION INSENSITIVE MASS FLOW CONTROLLER

CROSS-REFERENCE TO RELATED APPLICATION

This application claims priority to European Patent Office Application No. 15 177 191.2 filed Jul. 17, 2015, the entire disclosure of which is incorporated by reference in its entirety.

TECHNICAL FIELD

The present invention relates to a mass flow controller that is insensitive to or robust against inlet pressure perturbations. Furthermore, the present invention relates to a method for controlling a mass flow using such a mass flow controller.

PRIOR ART

A mass flow controller is a device that is used for accurately controlling a fluid flow, the fluid being, e.g., a gas, a liquid, or a mixture thereof. The controller typically receives a setpoint flow signal and controls the flow rate accordingly.

Mass flow controllers typically comprise a flow tube with an inlet and an outlet port, wherein a flow path is established between inlet and outlet. Moreover, the controllers comprise a flow meter with a flow sensor that is arranged in said flow path, or in a bypass thereof. Common controllers also comprise a control device and a control valve, the latter being arranged close to the outlet and controlled by the control device so as to regulate the total flow through the flow tube. The fluid flow is guided through the inlet into the controller and along said path through the mass flow meter. Downstream of the mass flow meter is arranged the control valve which is controlled by a control signal of the control device such as to keep the total mass flow through the controller at the given setpoint flow. The control valve is integrated into a control loop that provides the control valve with continuously or quasi-continuously refreshed control signals that are generated by the control device in response to a flow meter signal sensed by the flow meter.

It is a well-known issue that an inlet pressure at the fluid inlet of the mass flow controller may be subject to undesired perturbations due to unstable upstream pressure source conditions. As per design, a pneumatic characteristic due to a finite volume of the fluid path between the mass flow meter and the control valve exists, i.e. a fluidly active pneumatic volume. Inlet pressure perturbations lead to pressure gradients in said pneumatic volume which, in turn, cause detrimental extra flow components that form a false flow into the pneumatic volume of the mass flow controller. Accordingly, such fore pressure transients may render inaccurate the actual mass flow exiting the controller.

This very problem is commonly addressed by using a pressure-based flow meter, or an additional pressure sensor, that is operated for compensating inlet pressure fluctuations while the actual flow measurement is done by an accurate thermal flow meter. Such teachings may be found in U.S. Pat. Nos. 7,809,473, 7,216,019, 5,129,418, or US 2007/0174016 A1.

US 2014/0158211 A1 further discloses a mass flow controller with two flow meters, wherein one flow meter is pressure variation sensitive, i.e. it has a short response time constant, while the sensing principle is based on a differential pressure measurement and a temperature measurement, from which measurements the mass flow is calculated. This flow meter is therefore able to detect inlet pressure fluctuations. The other flow meter is a comparably slow but accurate thermal flow meter that directly measures the mass flow and that is more prone to inaccuracy due to such pressure fluctuations. The mass flow controller further comprises a control valve that is controlled in dependence of a measurement signal of one of the flow meters, the controlling flow meter. Additionally, a control device monitors the two simultaneously measuring flow meters, wherein the control device outputs an alarm if the two flow meter measurements differ from one another more than a preset value, the alarm being thus indicative of pressure fluctuations. In order to solve the above-stated problem, the mass flow controller is configured to change the controlling flow meter in function of the actual flow meter measurement, particularly such that, upon detection of inlet pressure disturbances, the pressure variation sensitive flow meter becomes the controlling flow meter.

SUMMARY OF THE INVENTION

It is an object of the present invention to provide an accurate mass flow controller that is less sensitive to inlet pressure transients.

This object is achieved by a mass flow controller that comprises:

a fluid inlet for supplying with an inlet pressure a fluid into said mass flow controller so as to establish a flow therethrough (i.e. through the mass flow controller);

at least one first flow meter configured and arranged to measure a first flow rate and to output a first flow signal, the first flow signal being indicative of the first flow rate;

at least one second flow meter configured and arranged to measure a second flow rate and to output a second flow signal, the second flow signal being indicative of the second flow rate;

a control device connected to said first and second flow meters and configured and arranged to generate a control signal C; and at least one control valve connected to said control device and configured and arranged to control a total flow rate through the mass flow controller in response to the control signal C;

wherein the control signal C is generated as a function of both the first and second flow signals such that the mass flow controller's sensitivity to perturbations of said inlet pressure is minimized.

Within the context of the present invention the term "flow meter" relates to a measuring device with a flow sensor that is constructed and arranged to measure a fluid flow, the fluid being preferably a gas, alternatively liquid, or any fluid mixture.

Within the context of the present invention the term "flow signal" relates to a signal that is indicative of the flow rate at the flow meter's flow sensor location. The flow signal may be "outputted" to the control device, i.e. it is provided to and also received by the control device for further processing.

Within the context of the present invention the term "control signal" relates to a drive signal for the control valve for regulating the total flow rate through the control valve. If there are several control valves, there is a total flow rate through each control valve. Accordingly, the flow meters are "connected" to the control device, i.e. they are configured and arranged such that the control device may receive the flow signal from the flow meters.

According to invention, the control signal C is calculated from at least two flow signals from the at least two different flow meters. Accordingly, the control signal C is a result of at least two different flow signals.

It is to be understood that more than one first flow meter and/or more than one second flow meter may be comprised and used by the mass flow controller according to invention to generate, by averaging methods, an even better control signal C.

The mass flow controller is preferably constructed such that the first and second flow meters pick up fast inlet pressure variations that occur on a time scale ranging between 1 millisecond and 500 milliseconds, more preferably between 5 millisecond and 200 milliseconds, most preferably between 10 milliseconds and 150 milliseconds. This means, that a pressure pulse has a mean half width ranging between said times, i.e. between 1 millisecond and 500 milliseconds, more preferably between 5 milliseconds and 200 milliseconds, most preferably between 10 milliseconds and 150 milliseconds. However, also slow absolute inlet pressure changes in the range of seconds can be precisely detected by means of the first and second flow meters.

The control signal C is generated such that the control valve compensates for sensed inlet pressure variations such that the total flow rate is as close as possible to the setpoint flow, which, in effect, makes the mass flow controller according to invention more robust against inlet pressure variations or, in other words, makes the mass flow controller less sensitive to inlet pressure perturbations or minimizes the controller's sensitive to inlet pressure perturbations.

In preferred embodiments, fast inlet pressure perturbations, i.e. pressure shocks, on the time scale of equal to or less than 500 milliseconds, preferably equal to or less than 100 milliseconds, more preferably equal to or of less than 50 milliseconds, 10 milliseconds, or 5 milliseconds may be detected by means of the fast flow meters (see above). If the reaction time of the valve or the time constant of the flow sensor is in the time range of the pressure shocks, the control device is configured to keep the control valve steady during such pressure shocks. This is advantageous as valve regulation steps in response to fast pressure shocks may result in undesirable inaccuracy.

Accordingly, in a preferred embodiment, the mass flow controller comprises first and second flow meters that are configured to sense inlet pressure shocks occurring on the time scale of equal to or less than 500 or 100 milliseconds, preferably equal to or less than 50 milliseconds, more preferably equal to or of less than 5 milliseconds, wherein the control device is configured to keep the control valve stable during said inlet pressure shocks occurring on the time scale of equal to or less than 500 or 100 milliseconds, preferably equal to or less than 50 milliseconds, more preferably equal to or of less than 5 milliseconds. At the same time, inlet pressure variations on a time scale being longer than the one of the inlet pressure shocks are used to calculate the substantially inlet pressure variation independent control signal C for regulating the control valve.

Accordingly, in preferred embodiments, the value of time scale defining fast pressure shock may be inputted, by the user or the manufacturer, such that the control signal C is only generated on the basis of inlet pressure variation that are slower than said pressure shocks while the control valve is not regulated due to such pressure shocks.

The present invention is based on the insight that a plurality of inlet pressure variation sensitive flow meters may be used to generate flow signals and the control valve may then be controlled by a control signal C that is generated on the basis of at least two flow meter signals. As the at least two flow signals are subject and sensitive to the same pressure disturbances, their difference or an equivalent thereof is independent of said disturbances which allows constructing a control loop that compensates for inlet pressure variations picked-up by the first and second flow meters.

In some embodiments, the first flow meter has a first sensor response time constant $\tau_1$ and the second flow meter has a second sensor response time constant $\tau_2$, wherein said first and second flow meters are constructed such that said first and second sensor response time constants $\tau_1$, $\tau_2$ are shorter than or equal to 250 milliseconds, preferably shorter than or equal to 100 milliseconds, more preferably shorter than or equal to 10 milliseconds. This allows picking-up pressure variations in the time frame below 250 milliseconds, more preferably below 200 milliseconds, most preferably below 10 milliseconds.

In some embodiments, the mass flow controller is constructed such that fast pressure shocks in the time frame of or below 100 milliseconds, 50 milliseconds, or 10 milliseconds are not fed into the control loop either by having flow meters that are not as fast (i.e. they do not sense such fluctuations) or by electronic means, e.g. electronic or digital filtering means. This avoids that the control valve tries to compensate fast pressure variations that do not lead to noticeable false flow rates, as an overly agile control valve, i.e. a valve that regulates too quickly, tends to disturb the flow arrangement unnecessarily.

In some embodiments said first and second flow meters are constructed such that their first and second sensor response time constants $\tau_1$, $\tau_2$ are substantially equal to one another. In the context of the present invention, the term "substantially equal" means that the absolute difference between the sensor response time constants $\tau_1$, $\tau_2$ is less than 100% of either one, preferably less than 50% of either one, more preferably less than 5% of either one. Advantageously, the first and second sensor response time constants $\tau_1$, $\tau_2$ of the flow sensors are substantially equal to one another since then they sense the same pressure variation spectrum and the inlet pressure variations may be best compensated for by aid of said control loop.

In some embodiments, the first and second flow sensors are of the same type. For example, both flow meters may be thermal flow meters. Particularly preferred flow meters are the Sensirion® flow meters such as described in WO 2012/021999 A1 or flow sensors as described in EP 1 840 535. Thermal time constants for micro-machined silicon flow sensors may be used that are in the range between 1 millisecond and 10 milliseconds, e.g. 3 milliseconds.

Other types of flow meters that may be used are, e.g., differential pressure based flow meters, Coriolis flow meters, magnetic flow meters, or ultrasonic flow meters.

The present invention works particularly well for mass flow controllers with flow rate ranges between 1 milliliter/minute to 1000 milliliters/minute, in particular for flow rates smaller than 100 milliliters/minute.

Most preferably, the first and second flow meters are of identical design, i.e. they are constructed the same way, or in other words: They are identical flow meters. This ensures that they sense the same pressure variation spectrum.

In some preferred embodiments, at least one, preferably all of the first and second flow meters are thermal flow meter(s). Such thermal flow meters may have a bypass channel with a membrane-based thermal flow sensor with two temperature sensors such as thermopiles arranged on the membrane and one heater element arranged between the thermopiles.

In some embodiments, the first flow meter is arranged in a first fluid path of the mass flow controller and the second flow meter is arranged in a second fluid path of the mass flow controller, wherein the first and second fluid paths are extending parallel, i.e. separate, to one another. Accordingly, the term "parallel" is not meant in a geometrical sense; the term is to be understood as two separate flow paths that extend independently of one another but are connected to the same source (the inlet), a parallel arrangement, so to say, as it is used in equivalent circuit diagrams. The first and second fluid paths extend downstream of the first and second flow meters, respectively.

Accordingly, in this parallel arrangement, the general flow path through the mass flow controller splits up into two branches, wherein the branches extend separate from one another, comprise the first and second fluid paths, respectively, and are fluidly connected to the fluid inlet. Accordingly, both flow meters sense the same inlet pressure variations.

In some embodiments, the first fluid path extends from the first flow meter to the control valve and the second fluid path extends from the second flow meter and terminates in a dead end in the mass flow controller. Accordingly, first and second flow meters sense the same inlet pressure variations while only some of the flow guided along the first flow path exits the mass flow controller through its outlet. The rest of the flow may be guided into internal volumes of the controller.

Preferably, the control signal C may be generated on the basis of a first difference $\Delta_1$ between the first and second flow signals $FS_1$ and $FS_2$. The difference $\Delta_1$ may be written as
wherein $f$ and/or $g$ may be a complex function which can be expanded in a polynomial function or the identity function or a correlation stored in lookup tables.

Accordingly, additionally or in the alternative of such complex functions $f$, $g$, lookup tables may be used when implementing the invention. The functions and lookup table entries may be determined by calibration measurements, where first and second flow meters are calibrated over a pressure ramp at different flows $F_{out}$ and/or by simulations and/or by calculations.

Here, the term $FS_1(\text{flow})$ is to be understood as the first flow signal $FS_1$ as a function of the fluid flow through the first flow meter, wherein the first flow meter senses the flow that exits through the control valve, i.e. the total flow, and additionally the false flow due to the inlet pressure variations. The second flow meter $FS_2$ only senses the false flow due to the pressure variations. As the overall flow through the first flow meter is considerably larger than the flow through the second flow meter, e.g., by a factor ranging between 1.1 to 1000, the first flow meter measures in a different regime and may be subject to additional effects from, e.g., turbulent flow conditions. Accordingly, the $FS_1$ signal may be corrected to compensate for these effects. The corrections may be done based on calibration measurements and/or based on simulations and/or calculations and may be implemented by means of functions and/or lookup tables.

The identity function is a relation that always returns the same value that was used as its argument. Examples of the polynomial function may be an expansion of an exponential function or a polynomial function obtained by polynomial approximation of measurement data.

In some embodiments, the first flow meter is arranged in a first fluid path of the mass flow controller and the second flow meter is arranged in a second fluid path of the mass flow controller, wherein the first and second fluid paths are arranged in a series connection with respect to one another. The series arrangement may be an alternative to the parallel arrangements.

In some embodiments, the two kinds of arrangements may also be combined, e.g. by providing more than two flow meters. One may arrange at least two flow meters in parallel and at least on third flow meter in series with at least one of the parallel flow meters.

In case of a serial arrangement, the control signal C may be generated on the basis of a second difference $\Delta_2$ between the first and second flow signals $FS_1$, $FS_2$. The difference $\Delta_2$ may be written as $$\Delta_2 = f(FS_2(\text{flow})) - [g(FS_1(\text{flow})) - f(FS_2(\text{flow}))],$$

wherein $f$ and/or $g$ is the polynomial function or the identity function or a dependency defined in lookup tables as explained above.

$FS_1(\text{flow})$ and $FS_2(\text{flow})$ are again to be understood as the first and second flow signal as a function of the fluid flow through the first and second flow meters. The first and second flow meters sense the flow that exits through the valve and also the false flow due to inlet pressure variations. Therefore, the first and second flow signals may be subject to additional effects from, e.g., turbulent flow conditions. Accordingly, the first and second signals may be corrected to compensate for these effects. The corrections may be done based on calibration measurements and/or based on simulations and/or calculations and may be implemented by means of functions and/or lookup tables.

As an example the flow to be controlled may be 100 milliliters/minute. A pressure fluctuation may lead to a flow measured by the first flow sensor of 102 milliliters/minute and a flow measured by the second flow sensor of 101 milliliters/minute. Therefore, the measured flow signals results in flow control errors in the percentage range.

Preferably, the control device takes into account a substantially disturbance free difference or equivalent thereof between the first and second flow signals. Within the context of the present invention the term "difference" relates to a control signal C that is generated by subtracting the first flow meter signal or a derivative thereof from the second flow meter signal or a derivative thereof or vice versa, such that the signal component related to the inlet pressure perturbations are smaller or even absent in the control signal C as compared to the first or second flow meter signal. Accordingly, either the first or the second flow meter signal or an equivalent thereof may be the minuend.

In some embodiments, the first path has a first pneumatic characteristic and the second path has a second pneumatic characteristic, wherein the first and second pneumatic characteristics are substantially equal to one another. The pneumatic characteristic is defined by the pneumatic volume and the pneumatic resistance of the corresponding flow path. The pneumatic volume may be the respective volume between the sensor and the valve or the dead end, respectively, in which the pressure (or the pressure variation) acts while the pneumatic resistance defines the flow magnitude, i.e. the pneumatic resistance defines how fast the respective volume is actually filled. In the context of the present invention, the term "substantially equal" means that the absolute difference between the two volumes is less than 50% of either one, preferably less than 10% of either one, more preferably less than 5% of either one.

In one aspect, the present invention relates to using a mass flow controller with at least two flow meters and a control valve, the flow meters providing flow signals, wherein at least two flow signals are used to generate a control signal for regulating the control valve.

In some embodiments, the mass flow controller preferably comprises an integrated circuitry, the integrated circuitry being configured:
to receive the first and second flow signals $FS_1$, $FS_2$;
to calculate the control signal C that is substantially independent of the inlet pressure perturbations (i.e. the signal components due to the inlet pressure variations are minimized in or removed from signal C); and
to output said control signal C to the control valve.

In a further aspect, the present invention relates to a computer program product comprising computer program code, wherein the program code, when carried out in an integrated circuitry, causes the integrated circuitry:
to receive the first and second flow signals $FS_1$, $FS_2$;
to calculate the control signal C that is substantially independent of the inlet pressure perturbations (i.e. the signal components due to the inlet pressure variations are minimized in or removed from signal C); and
to output said control signal C to the control valve.

The computer program may be provided in a source code, in a machine-executable code, or in any intermediate form of code-like object code. It can be provided as a computer program product on a computer-readable medium in tangible form, e.g. on a CD-ROM or on a Flash ROM memory element, or it can be made available in the form of a network-accessible medium for download from one or more remote servers through a network.

The present invention also relates to a method for controlling a mass flow by means of a mass flow controller or a computer program product according to invention. Accordingly, the method of controlling uses at least two flow meters to provide flow signals, wherein a control signal is generated from the at least two flow signals, and wherein the control signal generated and used in a control loop for the control valve such that the effect of inlet pressure variations is minimized.

It is to be understood that these aspects will be better understood when considered with the description of the preferred embodiments below. Aspects may be combined with one another without departing from the scope of the appended claims and further embodiment formed with parts or all the features of the embodiments below.

BRIEF DESCRIPTION OF THE DRAWINGS

Preferred embodiments of the invention are described in the following with reference to the drawings, by way of illustration the present preferred embodiments of the invention only and not by way of limitation. Various modifications, additions, rearrangements, and substitutions will become apparent to the person skilled in the art from the disclosure. In the drawings.

DESCRIPTION OF PREFERRED EMBODIMENTS

Figure 1:
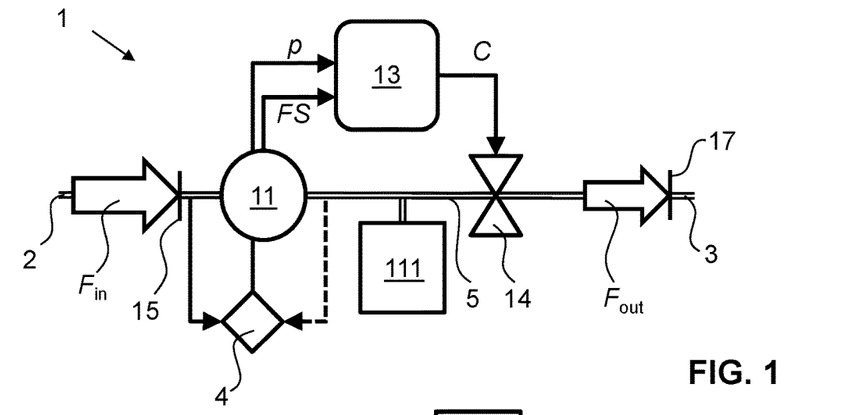
FIG. 1 shows a state of the art mass flow controller.

FIG. 1 shows in a schematic manner a common mass flow controller 1. The state of the art controller 1 comprises a fluid inlet 15 and a fluid outlet 17, the fluid inlet and outlet 15 and 17, respectively, being coupled to one another and comprise a fluid path 5. In the fluid path 5 there may be arranged a flow restrictor (not shown). There is also indicated a supply path 2 to and a discharge path 3 from the fluid path 5, the fluid inlet 15 being coupled to the supply path 2 and the fluid outlet 17 being coupled to the discharge path 3. The supply path 2 is adapted to supplying the common mass flow controller 1 with an inlet fluid flow with a flow rate $F_{in}$ while the discharge path 3 is adapted to receive a discharge fluid flow with an outlet flow rate $F_{out}$.

Downstream of the fluid inlet 15 is arranged one flow meter 11. The flow meter 11 is configured and arranged to measure and output a flow signal FS indicative of the flow rate in the fluid path 5 at the location of the sensor of the flow meter 11 (not shown).

Downstream of the flow meter 11 and upstream of the fluid outlet 17 is arranged one control valve 14. The control valve 14 is configured and arranged to regulate the output flow $F_{out}$ of fluid out of the common mass flow controller 1.

The fluid path 5, extending between the flow meter 11 and the control valve 14, has a pneumatic characteristic 111 that is schematically indicated by a simple box in FIG. 1. The pneumatic characteristic 111 is defined by the pneumatic volume and the pneumatic resistance of the corresponding flow path. The fluid path 5 represents the pneumatic resistance of the system.

The known controller 1 further comprises a control device 13. The control device 13 is configured to receive the flow meter signal FS generated by the flow meter 11. Moreover, the control device 13 comprises a control loop such as to drive the control valve 14 based on the flow meter signal FS for regulating the outlet flow rate $F_{out}$ according to the setpoint value. Variations in the inlet pressure lead to pressure gradients in the pneumatic characteristic 111. These pressure gradients lead to a false flow and therefore disturb the discharge flow rate $F_{out}$. Therefore, the known mass flow controller 1 uses a pressure sensor 4 that monitors the pressure in the flow path 5, either downstream or upstream of the flow meter 11, as taught in the above-mentioned state of the art documents. The pressure sensor 4 is constructed and arranged to generate a pressure signal p that is fed into the control device's 13 control loop to compensate the inlet pressure perturbations by driving the control valve 14 accordingly. The pressure signal p may be sensed upstream (cf. solid line in FIG. 1) or downstream (cf. broken line in FIG. 1) of the flow meter 11.

Figure 2:
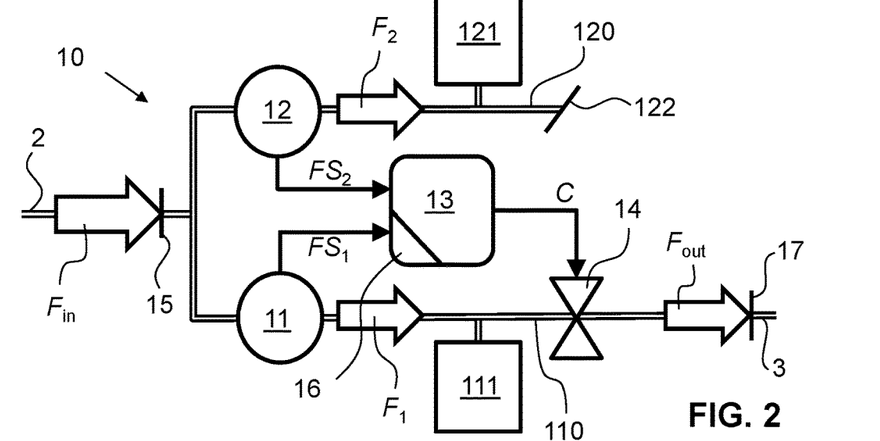
FIG. 2 shows a first embodiment of the mass flow controller according to the present invention.

FIG. 2 shows a first embodiment of the mass flow controller 10 according to the present invention. In the Figures, the same reference numerals designate the same functional parts. Accordingly, the mass flow controller 10 comprises the fluid inlet 15 and the fluid outlet 17, the fluid inlet and outlet 15 and 17, respectively, being coupled to one another and comprise a first fluid path 110 therebetween. FIG. 2 also shows the supply path 2 and the discharge path 3 connected to the fluid path 110. Moreover, the mass flow controller 10 comprises a second fluid path 120, the second fluid path 120 extending parallel (i.e. separate and not necessarily parallel in the geometrical sense) to the first fluid path 110. Both first and second fluid paths 110, 120 sense the same inlet pressure coupled into the respective path 110, 120 at their upstream ends. The supply path 2 is adapted to supplying the common mass flow controller 1 with an inlet fluid flow with the flow rate $F_{in}$ while the inlet flow may be subject to undesired variations. The discharge path 3 is adapted to receive from the fluid path 110 the discharge fluid flow with an outlet flow rate $F_{out}$.

A first flow meter 11 is arranged in the first fluid path 110 downstream of the fluid inlet 15 and upstream of the control valve 14. A second flow meter 12 is arranged in the second fluid path 120 downstream of the fluid inlet 15. The second fluid path 120 terminates downstream of the second flow meter 12 in a dead end 122.

The first and second flow meters 11, 12 are configured and arranged to measure and to output first and second flow signals $FS_1$ and $FS_2$, respectively.

Downstream of the first flow meter 11 and upstream of the fluid outlet 17 is arranged the control valve 14. The control valve 14 is configured and arranged to control the output flow $F_{out}$ out of the mass flow controller 10.

The first fluid path 110, extending between the first flow meter 11 and the control valve 14, has a first pneumatic characteristic 111 that is schematically indicated by a box in FIG. 2. The second fluid path 120, extending between the second flow meter 12 and the dead end 122, has a second pneumatic characteristic 121 that is schematically indicated by a box in FIG. 2.

The mass flow controller 10 further comprises the control device 13 with integrated circuitry 16. The control device 13 is constructed and arranged to receive the first and second flow meter signals $FS_1$ and $FS_2$. The control device 13 is further constructed and arranged to continuously or quasi-continuously generate, on the basis of both the first and second flow meter signals $FS_1$ and $FS_2$, the control signal C for driving the control vale 14 to keep the outlet flow rate $F_{out}$ at the setpoint value while minimizing the influence of the inlet pressure perturbations. Therefore, the control device 13 is configured to calculate a difference between the first and second flow meter signals $FS_1$ and $FS_2$, wherein the calculated difference is indicative of the pressure base line without or only minimal indication of the inlet pressure perturbations. Accordingly, the difference between any of the first and second flow meter signals $FS_1$ or $FS_2$ and the calculated difference is indicative of the inlet pressure perturbations. Furthermore, the control device 13 is configured to generate, based on said calculated difference, the drive signal C such as to compensate for the inlet pressure fluctuations.

The first and second flow meters 11, 12 are identical, fast thermal mass flow meters as described above. Fast means here that the sensors are able to detect inlet pressure variations on a time scale of less than 100 milliseconds, preferably less than 10 milliseconds. Both first and second pneumatic characteristics 111, 121 and the corresponding line resistances are preferably substantially the same. Therefore, both first and second flow meters 11, 12 and first and second pneumatic characteristics 111, 121 have substantially the same sensor response time constants $\tau_1, \tau_2$ in the millisecond range and the same pneumatic response time constants $\tau_3, \tau_4$ that are longer or equal to the sensor response time constants $\tau_1, \tau_2$ and pick up the same inlet pressure spectrum.

Figure 3:
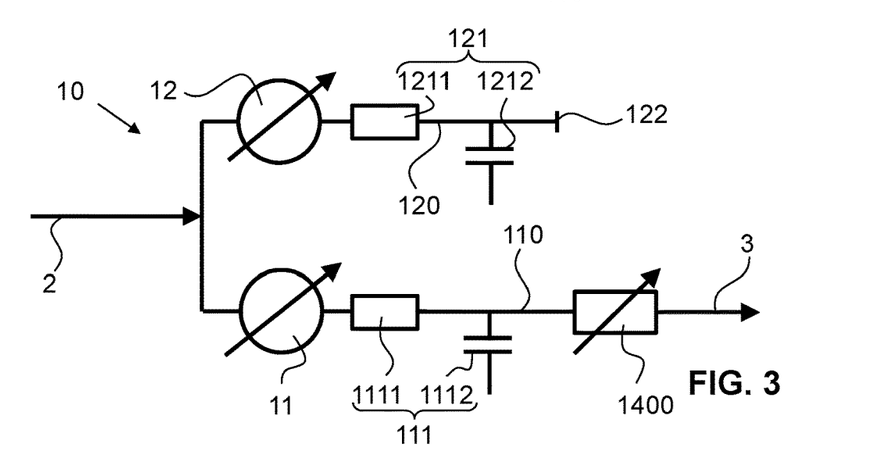
FIG. 3 shows an equivalent circuit diagram of the first embodiment.

The pneumatic response time constants $\tau_3, \tau_4$ are best explained in the context of the equivalent circuit diagram according to FIG. 3. A charging current flows through first and second equivalent ohmic resistor 1111, 1211, respectively, and charges first and second equivalent capacitors 1112, 1212, respectively. The characteristic RC-time constant for this electric charging process is equivalent to the respective pneumatic response time constant $\tau_3$, and $\tau_4$, respectively.

It is, however, conceivable that there is a difference in the first and second response time constants $\tau_1, \tau_2$. This difference may be due to different first and second flow meters 11, 12. It is also possible to have different pneumatic time constants $\tau_3, \tau_4$ due to different first and second pneumatic characteristics 111, 121 or line resistances 1111, 1211 and/or capacitors 1112, 1212. Such differences may be quantified and considered by the control device 13 when it generates the drive signal C. The differences may be quantified by means of calibration measurements and/or simulations and/or calculations.

Generally, the difference between the first and second flow meter signals $FS_1$ and $FS_2$ may be calculated according to the following formula, $$\Delta_1 = f(FS_1(\text{flow})) - g(FS_2),$$

wherein $f$ and/or $g$ is preferably a polynomial function or the identity function. Alternatively, $\Delta_1$ may be determined by means of lookup tables that have been created during calibration measurements.

The exact mathematical solution for the equivalent electronic circuit diagram according to FIG. 3 is:

$$\Delta_1 = FS_1 - FS_2 * \gamma * e^{-t*\left(\frac{1}{\tau 4} - \frac{1}{\tau 3}\right)}$$

$$\gamma = \frac{R_{1211}}{R_{1111}}; \tau_4 = R_{1211} * C_{1212}; \tau_3 = R_{1111} * \frac{C_{1112}}{\left[1 + \frac{R_{1111}}{R_{1400}}\right]}; t = \text{time}$$

wherein $R_{1211}$ and $R_{1111}$ denote the first and second equivalent ohmic resistors and wherein $C_{1212}$ and $C_{1112}$ denote the first and second equivalent capacitors. $R_{1400}$ denotes the equivalent tunable resistor.

FIG. 3 shows an equivalent circuit diagram of the first embodiment according to FIG. 2. The first and second pneumatic characteristics 111, 121 are depicted as a combination out of first and second equivalent ohmic resistors 1111, 1211 and first and second equivalent capacitors 1112, 1212. The first and second pneumatic response time constants $\tau_3, \tau_4$ are given by the characteristics of the equivalent circuit components 1111, 1112, 1211, 1212. An equivalent tunable resistor 1400 is the equivalent for the control valve 14.

Figure 4:
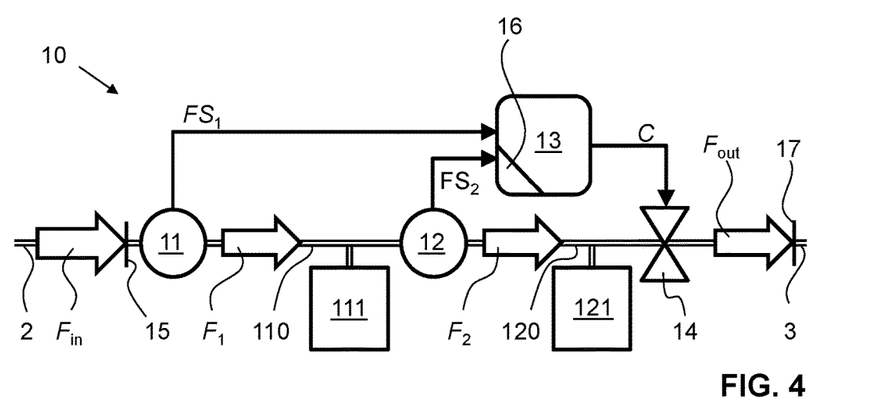
FIG. 4 shows a second embodiment of the mass flow controller according to the present invention.

FIG. 4 shows a second embodiment of the mass flow controller 10 according to the present invention. The same reference numerals designate the same parts. The first flow meter 11 is arranged in a fluid path 110 downstream of the fluid inlet 15. The second flow meter 12 is arranged downstream of the first flow meter 11, i.e. in the same flow path. Accordingly, the first and second flow meters 11, 12 are arranged in a serial (or series) arrangement.

Downstream of the second flow meter 12 and upstream of the fluid outlet 17 is arranged the control valve 14. The control valve 14 is configured and arranged to control the output flow $F_{out}$ out of the mass flow controller 10.

The fluid path 110, extending between the first flow meter 11 and the second flow meter 12, has the first pneumatic characteristic 111 with corresponding line resistance 1111 and capacitor 1112, between the second flow meter 12 and the control valve 14 is the second pneumatic characteristic 121 with corresponding line resistance 1211 and capacitor 1212.

The mass flow controller 10 further comprises the control device 13 with integrated circuitry 16. The control device 13 is constructed and arranged to receive the first and second flow meter signals $FS_1$ and $FS_2$. The control device 13 is constructed and arranged to continuously or quasi-continuously generate, on the basis of both the first and second flow meter signals $FS_1$ and $FS_2$, the control signal C for driving the control vale 14 to keep the outlet flow rate $F_{out}$ at the setpoint value while minimizing the influence of the inlet pressure perturbations.

The control device 13 is configured to calculate a difference between the first and second flow meter signals $FS_1$ and $FS_2$, wherein the calculated difference is indicative of the pressure base line but not the pressure perturbations. Accordingly, the difference between any of the first and second flow meter signals $FS_1$ and $FS_2$ and the calculated difference is indicative of the pressure perturbations. Furthermore, the control device 13 then is configured to generate based on said calculated difference the drive signal C such as to compensate for the inlet pressure fluctuations.

It is, however, conceivable that there is a difference in the first and second sensor response time constants $\tau_1$, $\tau_2$ or in the pneumatic response time constants $\tau_3$, $\tau_4$. This difference may be due to different first and second flow meters 11, 12 or due to different first and second pneumatic characteristics 111, 121. Such a difference may be quantified and considered by the control device 13 when it generates the drive signal C.

Generally, the difference between the first and second flow meter signals $FS_1$ and $FS_2$ may be calculated according to the following formula, $$\Delta_2 = f(FS_2(\text{flow})) - [g(FS_1(\text{flow})) - f(FS_2(\text{flow}))],$$

wherein $f$ and/or $g$ is preferably a polynomial function or the identity function as described above. Alternatively, $\Delta_2$ may be determined by means of lookup tables that have been created during calibration measurements.

Figure 5:
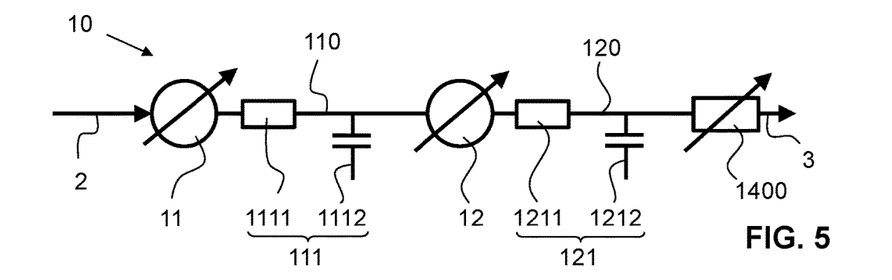
FIG. 5 shows an equivalent circuit diagram of the second embodiment.

FIG. 5 shows an equivalent circuit diagram of the second embodiment according to FIG. 4. The first and second pneumatic characteristics 111, 121 are depicted as a combination out of first and second equivalent ohmic resistors 1111, 1211 and first and second equivalent capacitors 1112, 1212. The first and second pneumatic response time constants $\tau_3$, $\tau_4$ are given by the characteristics 111, 121 of the equivalent circuit components 1111, 1112, 1211, 1212. An equivalent tunable resistor 1400 is the equivalent for the control valve 14.

Figure 6:
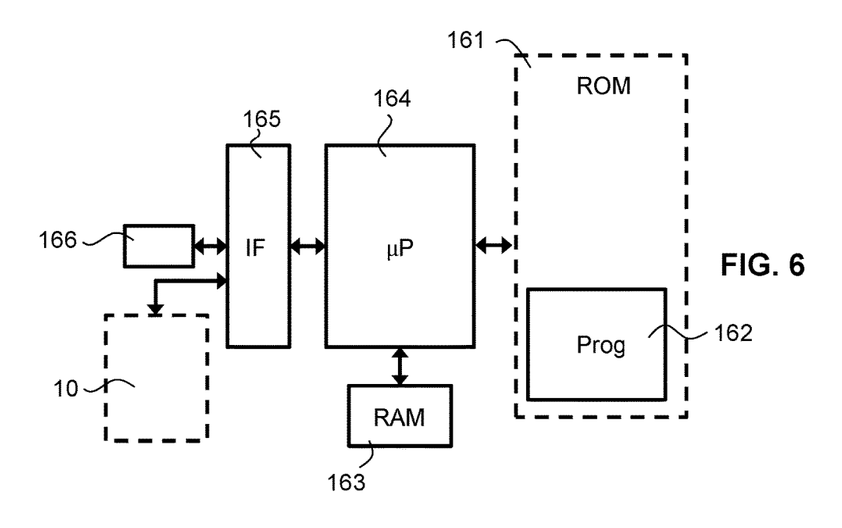
FIG. 6 shows a simplified block diagram of a computer program product for the mass flow controller according to the present invention.

FIG. 6 shows a simplified block diagram of a computer program product for the mass flow controller 10 as described herein. The integrated circuitry 16 comprises a processor unit (CPU, μP) 164, a non-volatile (e.g. a Flash ROM) memory 161, and a volatile (RAM) memory 163. The processor 164 communicates with the memory modules 161, 163. The non-volatile memory 161 stores, inter alia, received or generated signals, as well as a machine-executable program code 162 for execution in the processor 164. Via a data interface 165, the processor 164 communicates with various peripherals, including, for example and depending on the application, the flow meters 11, 12 and the valve 14 and/or a user interface 166. The user interface 166 may include, e.g., at least one of a network interface for interfacing with an external input/output device, a dedicated input device such as a keyboard and/or mouse for inputting, e.g., setpoint flow values or the like, and a dedicated output device, such as, e.g., an LCD screen for displaying information.

The present invention is not limited to the above-described embodiments, it is to be understood that the invention may also be differently embodied within the scope of the following claims.

| LIST OF REFERENCE SIGNS | |
|---|---|
| 1 | mass flow controller (state of the art) |
| 2 | supply path |
| 3 | discharge path |
| 4 | pressure sensor |
| 5 | fluid path |
| 10 | mass flow controller |
| 11 | first mass flow meter |
| 110 | first fluid path |
| 111 | first pneumatic characteristic |
| 1111 | first equivalent resistor |
| 1112 | first equivalent capacitor |
| 12 | second mass flow meter |
| 120 | second fluid path |
| 121 | second pneumatic characteristic |
| 122 | dead end |
| 1211 | second equivalent resistor |
| 1212 | second equivalent capacitor |
| 13 | control device |
| 14 | control valve |
| 1400 | equivalent tunable resistor |
| 15 | fluid inlet |
| 16 | integrated circuitry |
| 17 | fluid outlet |
| C | control or drive signal |
| f, g | polynomial or identity function |
| $F_1$ | first flow rate in 110 |
| $F_2$ | second flow rate in 120 |
| $F_{in}$ | inlet flow rate |
| $F_{out}$ | outlet flow rate |
| FS | flow meter signal |
| $FS_1$ | first flow meter signal |
| $FS_2$ | second flow meter signal |
| p | pressure signal |
| $\Delta_1$ | first difference between $FS_1$ and $FS_2$ in parallel configuration |
| $\Delta_2$ | second difference between $FS_1$ and $FS_2$ in parallel configuration |
| $\tau_1$ | first sensor response time constant of 11 |
| $\tau_2$ | second sensor response time constant of 12 |
| $\tau_3$ | first pneumatic response time constant of 11 |
| $\tau_4$ | second pneumatic response time constant of 12 |

The invention claimed is:

1. A mass flow controller comprising:
   a fluid inlet for supplying with an inlet pressure a fluid into said mass flow controller so as to establish a flow therethrough;
   at least one first flow meter configured and arranged to measure a first flow rate and a second flow rate and to output a first flow signal $FS_1$;
   at least one second flow meter configured and arranged to measure the second flow rate and to output a second flow signal $FS_2$;
   a control device connected to said first and second flow meters and configured and arranged to generate a control signal;
   integrated circuitry; and
   at least one control valve connected to said control device and configured and arranged to control an outlet flow rate out of the mass flow controller in response to the control signal;

wherein the at least one first meter and the at least one second flow meter are of an identical type or of an identical design, wherein the control signal is calculated from the first and second flow signals such that the mass flow controller's sensitivity to perturbations of said inlet pressure is minimized, and wherein the integrated circuitry is configured:
to receive the first flow signal $FS_1$ and the second flow signal $FS_2$, to calculate the control signal that is substantially independent of the inlet pressure perturbations; and
to output said control signal to the control valve, wherein the control valve is controlled using the calculated control signal.

2. The mass flow controller according to claim 1, wherein the first flow meter has a first sensor response time constant and the second flow meter has a second sensor response time constant, wherein said first and second flow meters are constructed such that said first and second sensor response time constants are shorter than or equal to 200 milliseconds, or shorter than or equal to 100 milliseconds, or shorter than or equal to 50 milliseconds.

3. The mass flow controller according to claim 1, wherein said first and second flow meters are constructed such that their first and second sensor response time constants are substantially equal to one another.

4. The mass flow controller according to claim 1, wherein the first and second flow meters are thermal flow meters.

5. The mass flow controller according to claim 1, wherein the first flow meter is arranged in a first fluid path of the mass flow controller and the second flow meter is arranged in a second fluid path of the mass flow controller, wherein the first and second fluid paths are extending separate to one another.

6. The mass flow controller according to claim 5, wherein the first fluid path extends from the first flow meter to the control valve and wherein the second fluid path extends from the second flow meter and terminates in a dead end in the mass flow controller.

7. The mass flow controller according to claim 6, wherein the control signal is generated on the basis of a first difference $\Delta_1$ between the first flow signal $FS_1$ and the second flow signal $FS_2$, under a proviso that $$\Delta_1 = f(FS_1(\text{flow})) - g(FS_2),$$

wherein $f$ and $g$ are selected from the group comprising polynomial functions and an identity function and correlations stored in a lookup table.

8. The mass flow controller according to claim 1, wherein the first flow meter is arranged in a first fluid path of the mass flow controller and the second flow meter is arranged in a second fluid path of the mass flow controller, wherein the first and second fluid paths are arranged in a series connection with respect to one another.

9. The mass flow controller according to claim 8, wherein the control signal is generated on the basis of a second difference $\Delta_2$ between the first flow signal $FS_1$ and the second flow signal $FS_2$, under a proviso that $$\Delta_2 = f(FS_2(\text{flow})) - [g(FS_1(\text{flow})) - f(FS_2(\text{flow}))],$$

wherein $f$ and $g$ are a selected from the group comprising polynomial functions and the identity function and correlations stored in a lookup table.

10. The mass flow controller according to claim 5, wherein the first flow path has a first pneumatic characteristic and the second path has a second pneumatic characteristic, wherein the first and second pneumatic characteristics are substantially equal to one another.

11. The mass flow controller according to claim 1, wherein the first and second flow meters are configured to sense inlet pressure shocks occurring on a time scale of equal to or less than 100 milliseconds, or equal to or less than 50 milliseconds, or equal to or of less than 5 milliseconds, and wherein the control device is configured to keep the control valve stable during said inlet pressure shocks occurring on a time scale of equal to or less than 100 milliseconds, or equal to or less than 50 milliseconds, or equal to or of less than 5 milliseconds.

12. The mass flow controller according to claim 1, wherein the control signal is calculated by subtracting the first flow signal $FS_1$ or a derivative thereof from the second flow signal $FS_2$ or a derivative thereof; or wherein the control signal is calculated by subtracting the second flow signal $FS_2$ or a derivative thereof from the first flow signal $FS_1$ or a derivative thereof.

13. A non-transitory computer-readable storage medium comprising a computer program code, wherein the program code which is executable in a mass flow controller, the mass flow controller comprising:

a fluid inlet for supplying with an inlet pressure a fluid into said mass flow controller so as to establish a flow therethrough;

at least one first flow meter configured and arranged to measure a first flow rate and a second flow rate to output a first, flow signal $FS_1$;

at least one second flow meter configured and arranged to measure the second flow rate and to output a second flow signal $FS_2$;

a control device connected to said first and second flow meters and configured and arranged to generate a control signal;

integrated circuitry; and at least one control valve connected to said control device and configured and arranged to control an outlet flow rate out of the mass flow controller in response to the control signal;

wherein the at least one first meter and the at least one second flow meter are of an identical type or of an identical design, wherein the control signal is calculated from the first and second flow signals such that the mass flow controller's sensitivity to perturbations of said inlet pressure is minimized, said program code, when carried out in the integrated circuitry of the mass flow controller, causes said control device:

to receive the first flow signal $FS_1$ and second flow signal $FS_2$;

to calculate from said first flow signal $FS_1$ and second flow signal $FS_2$ the control signal that is substantially independent of the inlet pressure perturbations: and to output said control signal to the control valve, wherein the control valve is controlled using the calculated control signal.

14. A mass flow controller comprising:

a fluid inlet for supplying with an inlet pressure a fluid into said mass flow controller so as to establish a flow therethrough;

at least one first flow meter configured and arranged to measure a first flow rate and to output a first flow signal $FS_1$;

at least one second flow meter configured and arranged to measure a second flow rate and to output a second flow signal $FS_2$;

a control device connected to said first and second flow meters and configured and arranged to generate a control signal;

integrated circuitry; and at least one control valve connected to said control device and configured and arranged to control an outlet flow rate out of the mass flow controller in response to the control signal, wherein the at least one first flow meter and the at least one second flow meter are of an identical type or of an identical design, wherein the control signal is calculated from the first and second flow signals such that the mass flow controller's sensitivity to perturbations of said inlet pressure is minimized, wherein the integrated circuitry is configured:

to receive the first flow signal $FS_1$ and the second flow signal $FS_2$;

to calculate the control signal that is substantially independent of the inlet pressure perturbations; and to output said control signal to the control valve, wherein the control valve is controlled using the calculated control signal, wherein the first flow meter is arranged in a first fluid path of the mass flow controller and the second flow meter is arranged in a second fluid path of the mass flow controller, wherein the first and second fluid paths are arranged in a series connection with respect to one another, and wherein the control signal is generated on the basis of a second difference $\Delta_2$ between the first flow signal $FS_1$ and the second flow signal $FS_2$, under a proviso that $$\Delta_2 = f(FS_2(\text{flow})) - [g(FS_1(\text{flow})) - f(FS_2(\text{flow}))],$$

wherein $f$ and $g$ are a selected from the group comprising polynomial functions and the identity function and correlations stored in a lookup table.

15. A mass flow controller comprising:

a fluid inlet for supplying with an inlet pressure a fluid into said mass flow controller so as to establish a flow therethrough;

at least one first flow meter configured and arranged to measure a first flow rate and to output a first flow signal $FS_1$;

at least one second flow meter configured and arranged to measure a second flow rate and to output a second flow signal $FS_2$;

a control device connected to said first and second flow meters and configured and arranged to generate a control signal;

integrated circuitry; and at least one control valve connected to said control device and configured and arranged to control an outlet flow rate out of the mass flow controller in response to the control signal, wherein the at least one first flow meter and the at least one second flow meter are of an identical type or of an identical design, wherein the control signal is calculated from the first and second flow signals such that the mass flow controller's sensitivity to perturbations of said inlet pressure is minimized, wherein the integrated circuitry is configured:

to receive the first flow signal $FS_1$ and the second flow signal $FS_2$;

to calculate the control signal that is substantially independent of the inlet pressure perturbations; and to output said control signal to the control valve, wherein the control valve is controlled using the calculated control signal, wherein the first flow meter is arranged in a first fluid path of the mass flow controller and the second flow meter is arranged in a second fluid path of the mass flow controller, wherein the first and second fluid paths are extending separate to one another, wherein the first fluid path extends from the first flow meter to the control valve and wherein the second fluid path extends from the second flow meter and terminates in a dead end in the mass flow controller, and wherein the control signal is generated on the basis of a first difference $\Delta_1$ between the first flow signal $FS_1$ and the second flow signal $FS_2$, under a proviso that $$\Delta_1 = f(FS_1(\text{flow})) - g(FS_2),$$

wherein $f$ and $g$ are selected from the group comprising polynomial functions and an identity function and correlations stored in a lookup table.

* * * * *